United States Patent
Noyes et al.

(10) Patent No.: US 7,725,022 B2
(45) Date of Patent: May 25, 2010

(54) DYNAMIC AUTOMATIC EXPOSURE COMPENSATION FOR IMAGE CAPTURE DEVICES

(75) Inventors: Ying Xie Noyes, San Diego, CA (US); Ruben M. Velarde, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 899 days.

(21) Appl. No.: 11/508,379

(22) Filed: Aug. 22, 2006

(65) Prior Publication Data

US 2008/0050109 A1    Feb. 28, 2008

(51) Int. Cl.
  *G03B 7/08* (2006.01)
(52) U.S. Cl. ...................................... 396/234
(58) Field of Classification Search .................. 396/213, 396/233, 234; 348/362–368
See application file for complete search history.

(56) References Cited

U.S. PATENT DOCUMENTS

| | | | |
|---|---|---|---|
| 6,741,285 B2 * | 5/2004 | Takizawa | 348/364 |
| 7,010,160 B1 | 3/2006 | Yoshida | |
| 7,248,284 B2 * | 7/2007 | Pierce | 348/188 |
| 2006/0044459 A1 | 3/2006 | Kato | |

FOREIGN PATENT DOCUMENTS

| WO | 03019285 | 3/2003 |
|---|---|---|
| WO | 2006031690 | 3/2006 |

OTHER PUBLICATIONS

International Preliminary Report on Patentability—PCT/US07/076584, The International Bureau of WIPO—Geneva, Switzerland. Feb. 24, 2009.
International Search Report—PCT/US07/076584—International Search Authority—European Patent Office, Feb. 15, 2008.

* cited by examiner

*Primary Examiner*—W. B. Perkey
(74) *Attorney, Agent, or Firm*—Timothy F. Loomis; Espartaco Diaz Hidalgo

(57) ABSTRACT

Techniques are described for dynamic automatic exposure compensation within image capture devices. The techniques include dynamically adjusting a default target brightness for a scene to compensate an exposure value (EV) selected by an automatic exposure process. A sensor array obtains light information from the scene at a default target brightness and an image capture controller calculates brightness values of a plurality of regions in the scene based on the light information. An automatic exposure compensation module dynamically adjusts the default target brightness based on the brightness values for the plurality of regions in the scene and threshold values set for the sensor array to set an adjusted target brightness. The sensor array may then capture an image frame of the scene using an EV for the adjusted target brightness. The techniques also include building a hysteresis zone to substantially stabilize the adjusted target brightness over a sequence of image scenes.

53 Claims, 6 Drawing Sheets

DYNAMIC AUTOMATIC EXPOSURE COMPENSATION FOR IMAGE CAPTURE DEVICES

TECHNICAL FIELD

The disclosure relates to capturing images with an image capture device and, more specifically, adjusting an exposure value of the image capture device.

BACKGROUND

Image capture devices, such as digital video cameras or digital still cameras, are used in different applications and environments. An image capture device should be capable of producing high quality imagery under a variety of lighting conditions. For example, image capture devices should be capable of operating effectively in environments that include large amounts of reflected or saturated light, as well as in environments that include high levels of contrast. A typical image capture device performs automatic exposure to select an exposure value (EV) that achieves a certain target brightness for a scene. For example, an image capture device may select an EV that produces an image frame of the scene with an average brightness value equivalent to approximately 18% gray.

An automatic exposure process may adjust aperture size and shutter speed of the image capture device to correspond to the selected EV. In this way, the automatic exposure process controls an amount of light that reaches a sensor array within the image capture device to produce an image frame of a scene at the target brightness. However, some scenes may require a higher average brightness value while other scenes may require a lower average brightness value. For example, a snow scene includes a large amount of reflected light, for which the automatic exposure process may overcompensate, causing the image frame to look unnaturally dark. On the other hand, a scene containing a white document next to a black laptop includes a high contrast level, for which the automatic exposure process may also overcompensate, causing the white document to appear totally saturated in the image frame.

Exposure compensation is common in digital still cameras, but may also be utilized in digital video camera and other types of image capture devices. When the automatic exposure process does not provide the appropriate brightness for a scene, a user of the image capture device may perform exposure compensation by manually adjusting the EV selected by the automatic exposure process for the scene. The user may adjust the EV by manually setting the aperture size and shutter speed of the image capture device to let more or less light reach the sensor array within the image capture device to produce an appropriate brightness for the scene.

SUMMARY

In general, the disclosure relates to techniques for dynamic automatic exposure compensation within image capture devices. Image capture devices may include digital still cameras and digital video cameras. The techniques include dynamically adjusting a default target brightness for a scene to compensate an exposure value (EV) selected by an automatic exposure process within an image capture device. In this way, if the automatic exposure process originally selects an EV for the default target brightness that is either too bright or too dark for the scene, the techniques set an adjusted target brightness. The automatic-exposure process may then select an EV for the adjusted target brightness that produces an image frame of the scene with an appropriate brightness.

An image capture device includes a sensor array that obtains light information from a scene at a default target brightness and an image capture controller that calculates brightness values of a plurality of regions in the scene based on the light information. According to the techniques described herein, an automatic exposure compensation module included in the image capture device determines whether the default target brightness is accurate for the scene based on the brightness values of the plurality of regions in the scene and threshold values set for the sensor array. If the default target brightness is inaccurate, the automatic exposure compensation module dynamically adjusts the default target brightness to set an adjusted target brightness that is accurate for the scene. The sensor array may then capture an image frame of the scene using an EV for the adjusted target brightness. In this way, the techniques provide a simple and inexpensive solution to manual automatic exposure compensation.

In addition, the techniques may include building a hysteresis zone to substantially stabilize the adjusted target brightness over a sequence of image scenes. If the adjusted target brightness is inaccurate for the next scene, the automatic exposure compensation module may build the hysteresis zone by adjusting the threshold values set for the sensor array. In some cases, the automatic exposure compensation module included in the image capture device may build the hysteresis to maintain the adjusted target brightness for the next scene to prevent target brightness oscillation between the previous scene and the next scene. In other cases, the automatic exposure compensation module may build the hysteresis zone to minimally readjust the adjusted target brightness for the next scene to provide a gradual target brightness change between the previous scene and the next scene. This may be especially useful when capturing a series of still image frames or capturing video frames with the image capture device to reduce brightness changes between frames.

In one embodiment, the disclosure provides a method comprising obtaining light information from a scene with a sensor array included in an image capture device at a default target brightness, and calculating brightness values of a plurality of regions in the scene based on the light information. The method further comprising dynamically adjusting the default target brightness based on the brightness values of the plurality of regions in the scene and threshold values set for the sensor array to set an adjusted target brightness for the scene.

In another embodiment, the disclosure provides a computer-readable medium comprising instructions that cause a programmable processor to obtain light information from a scene with a sensor array included in an image capture device at a default target brightness, and calculate brightness values of a plurality of regions in the scene based on the light information. The instructions further cause the programmable processor to dynamically adjust the default target brightness based on the brightness values of the plurality of regions in the scene and threshold values set for the sensor array to set an adjusted target brightness for the scene.

In another embodiment, the disclosure provides a device comprising a sensor array that obtains light information from a scene at a default target brightness, and an image capture controller that calculates brightness values of a plurality of regions in the scene based on the light information. The device also includes an automatic exposure compensation module that dynamically adjusts the default target brightness based on the brightness values of the plurality of regions in the scene and threshold values set for the sensor array to set an adjusted target brightness for the scene.

In a further embodiment, the disclosure provides a device comprising means for obtaining light information from a scene at a default target brightness, means for calculating brightness values of a plurality of regions in the scene based on the light information, and means for dynamically adjusting the default target brightness based on the brightness values of the plurality of regions in the scene and threshold values to set an adjusted target brightness for the scene.

The techniques described herein may be implemented in hardware, software, firmware, or any combination thereof. If implemented in software, the techniques may be realized in whole or in part by a computer readable medium comprising instructions that, when executed by a processor, performs one or more of the methods described herein.

The details of one or more embodiments are set forth in the accompanying drawings and the description below. Other features, objects, and advantages will be apparent from the description and drawings, and from the claims.

DETAILED DESCRIPTION

Figure 1:
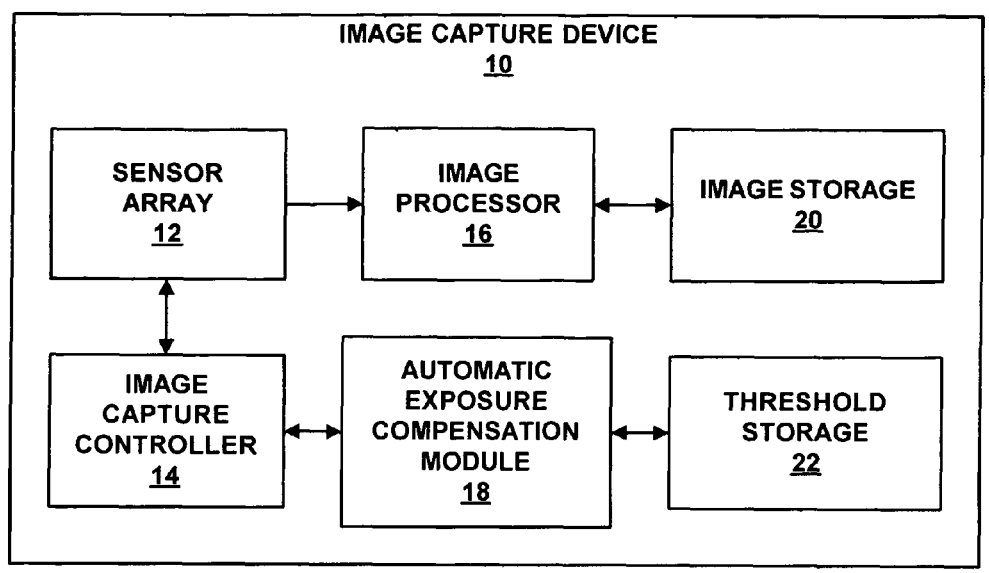
FIG. 1 is a block diagram illustrating an exemplary image capture device for capturing image information from a scene.

FIG. 1 is a block diagram illustrating an exemplary image capture device 10 for capturing image information from a scene. According to the techniques described in this disclosure, image capture device 10 performs dynamic automatic exposure compensation to dynamically adjust a default target brightness of a scene to compensate an exposure value (EV) selected by an automatic exposure process within image capture device 10. In this way, if the automatic exposure process within image capture device 10 originally selects an EV for the default target brightness that is either too bright or too dark for the scene, image capture device 10 may set an adjusted target brightness. The automatic exposure process within image capture device 10 may then select an EV for the adjusted target brightness that produces an image frame of the scene with an appropriate brightness.

As shown in FIG. 1, image capture device 10 includes a sensor array 12, an image capture controller 14, an image processor 16, an automatic exposure compensation module 18, an image storage device 20, and a threshold storage device 22. The components included in image capture device 10 illustrated in FIG. 1 may be realized by any suitable combination of hardware and/or software. In the illustrated embodiment, the components are depicted as separate units. However, in other embodiments, any of the components may be integrated into combined units within common hardware and/or software.

Image capture device 10 may be a digital camera, such as a digital video camera, a digital still camera, or a combination of both. In addition, image capture device 10 may be a stand-alone device, such as a stand-alone camera, or be integrated in another device, such as a wireless communication device. As an example, image capture device 10 may be integrated in a mobile telephone to form a so-called camera phone or video phone. Image capture device 10 preferably is equipped to capture color imagery, black-and-white imagery, or both. In this disclosure, the terms "image," "imagery," "image information," or similar terms may interchangeably refer to either video or still pictures. Likewise, the term "frame" may refer to either a video frame or a still picture frame obtained by image capture device 10.

Sensor array 12 obtains light information from a scene prior to capturing an image frame of the scene. Sensor array 12 includes a two-dimensional array of individual image sensors, e.g., arranged in rows and columns. Sensor array 12 may comprise, for example, an array of solid state sensors such as complementary metal-oxide semiconductor (CMOS) sensors. The image sensors within sensor array 12 are exposed to the scene to obtain light information from the scene and to capture an image frame of the scene.

Image capture controller 14 utilizes the light information for preliminary visual front end (VFE) processing, such as automatic focus and automatic exposure. For example, image capture controller 14 performs automatic exposure based on the light information from sensor array 12 to select an EV that achieves a default target brightness for the scene. The selected EV defines an aperture size to control the amount of light from the scene that reaches sensor array 12 and shutter speed to control an amount of time that sensor array 12 is exposed to the light from the scene. A typical default target brightness is approximately 18% gray. Therefore, image capture controller 14 performs automatic exposure to select an EV that produces an image frame of the scene with an average brightness value equivalent to approximately 18% gray.

In a conventional image capture device, a sensor array captures image frames of every scene using an EV for a default target brightness. However, some image frames may require a higher average brightness value while other image frames may require a lower average brightness value. For example, a snow scene includes a large amount of reflected light, for which the automatic exposure process may overcompensate, causing the image frame to look unnaturally dark. On the other hand, a scene containing a white document next to a black laptop includes a high contrast level, for which the automatic exposure process may also overcompensate, causing the white document to appear totally saturated in the image frame. A user of the conventional image capture device must then perform manual automatic exposure compensation.

The techniques disclosed herein enable image capture device 10 to perform dynamic automatic exposure compensation to dynamically adjust the default target brightness of image capture device 10 to compensate the EV when the default target brightness is inaccurate for a given scene. Sensor array 12 obtains light information from the scene at the default target brightness. Image capture controller 14 divides the scene into a plurality of regions, such as 256 evenly divided regions, and calculates average brightness values for each of the plurality of regions. The brightness values for each of the plurality of regions may comprise luminance values ranging between 0 (i.e., black) and 255 (i.e., white). Image capture controller 14 then sends the brightness values for the plurality of regions in the scene to automatic exposure compensation module 18.

Automatic exposure compensation module 18 determines whether the default target brightness of image capture device 10 is accurate for the scene based on the brightness values of the regions in the scene and threshold values set for sensor array 12. The default target brightness may be inaccurate for the scene when the brightness values of the plurality of regions in the scene are either too bright or too dark for the scene according to the threshold values. Threshold storage device 22 stores the threshold values set for sensor array 12 upon manufacture of image capture device 10. If the default target brightness is inaccurate, automatic exposure compensation module 18 dynamically adjusts the default target brightness to set an adjusted target brightness that is accurate for the scene. In this way, the techniques described herein provide a simple and inexpensive solution to manual automatic exposure compensation.

In addition, automatic exposure compensation module 18 may build a hysteresis zone to substantially stabilize the adjusted target brightness over a sequence of image scenes. If the adjusted target brightness is inaccurate for the next scene, automatic exposure compensation module 18 may build the hysteresis zone by adjusting the threshold values stored in threshold storage device 22. In some cases, automatic exposure compensation module 18 may build the hysteresis zone to maintain the adjusted target brightness for a next scene to prevent target brightness oscillation between the previous scene and the next scene. In other cases, automatic exposure compensation module 18 may build the hysteresis zone to minimally readjust the adjusted target brightness for a next scene to provide a gradual target brightness change between the previous scene and the next scene. This may be especially useful when capturing a series of still images or capturing video with image capture device 10 to reduce brightness changes between frames.

Automatic exposure compensation module 18 may be implemented as an independent hardware component or as a programmable feature of a logic device, such as a microprocessor, DSP or the like. In some embodiments, automatic exposure compensation module 18 may be a programmable or integrated feature of a logic device implementing image processor 16. In particular, automatic exposure compensation module 18 may be implemented as one or more software processes executed by such a logic device.

Automatic exposure compensation module 18 sends the adjusted target brightness to image capture controller 14. Image capture controller 14 then performs automatic exposure based on the adjusted target brightness to select an EV for the adjusted target brightness. Sensor array 12 may then capture an image frame of the scene using the EV for the adjusted target brightness. Using the EV, sensor array 12 receives light from the scene with an aperture size defined by the selected EV, and resets with a shutter speed defined by the selected EV. Sensor array 12 provides the captured image frame to image processor 16 for processing and storage in image storage device 20.

Image processor 16 receives the captured image frame from sensor array 12 and performs any necessary processing on the image frame. Image processor 16 may, for example, perform filtering, cropping, demosaicing, compression, image enhancement, or other processing of the image frame captured by sensor array 12. Image processor 16 may be realized by a microprocessor, digital signal processor (DSP), application specification integrated circuit (ASIC), field programmable gate array (FPGA), or any other equivalent discrete or integrated logic circuitry. In some embodiments, image processor 16 may form part of an encoder-decoder (CODEC) that encodes the image frame according to a particular encoding technique or format, such as MPEG-2, MPEG-4, ITU H.263, ITU H.264, JPEG, or the like.

Image processor 16 stores the image frame in image storage device 20. Image processor 16 may store raw image frames, processed image frames, or encoded image frames in image storage device 20. If the imagery is accompanied by audio information, the audio also may be stored in image storage device 20, either independently or in conjunction with the image frames. Image storage device 20 may comprise any volatile or non-volatile memory or storage device, such as read-only memory (ROM), electrically erasable programmable read-only memory (EEPROM), or FLASH memory, or such as a magnetic data storage device or optical data storage device.

Figure 2:
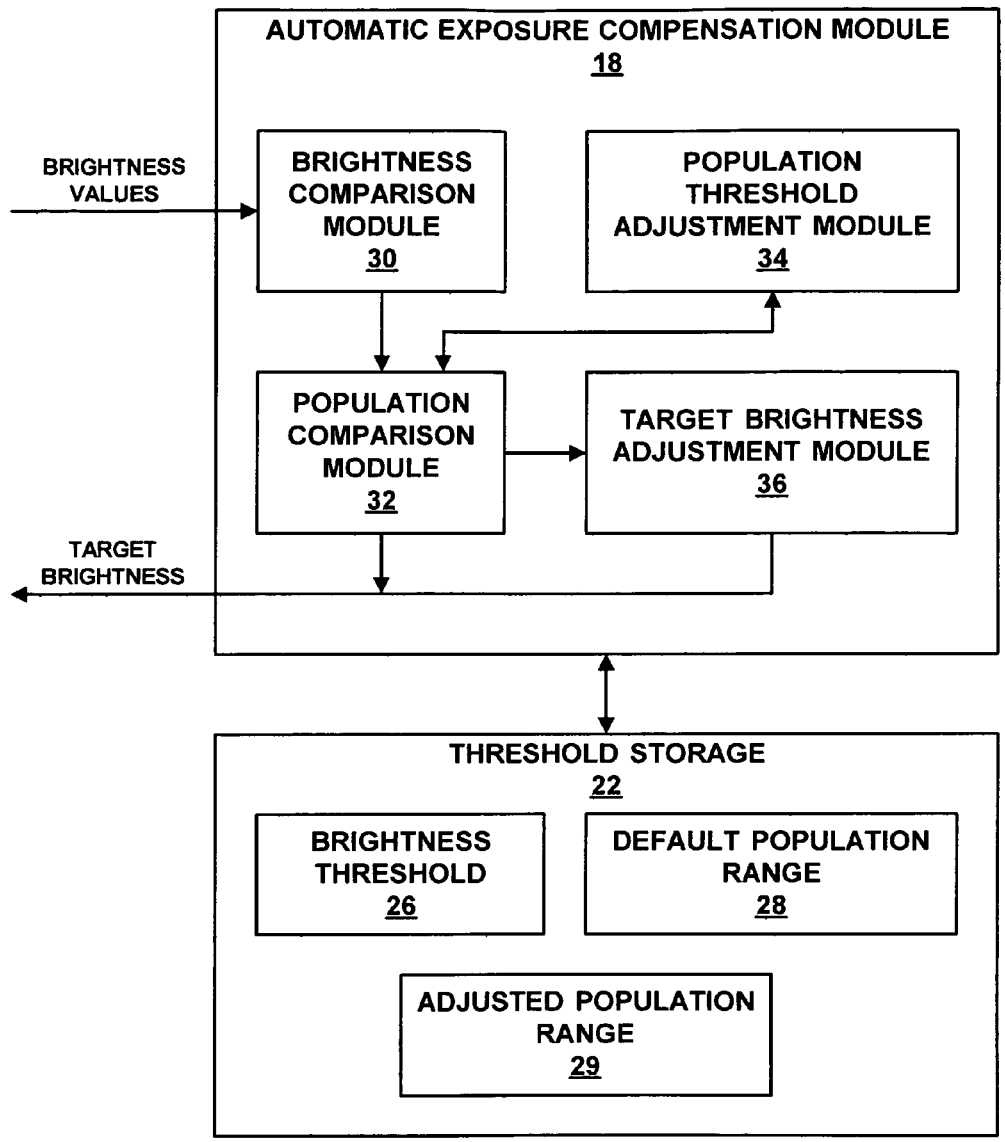
FIG. 2 is a block diagram illustrating an automatic exposure compensation module and a threshold storage device within the image capture device from FIG. 1 in greater detail.

FIG. 2 is a block diagram illustrating automatic exposure compensation module 18 and threshold storage device 22 from FIG. 1 in greater detail. As illustrated in FIG. 2, automatic exposure compensation module 18 includes a brightness comparison module 30, a population comparison module 32, a population threshold adjustment module 34, and a target brightness adjustment module 36. Automatic exposure compensation module 18 receives brightness values of a plurality of regions in a scene from image capture controller 14, and outputs an adjusted target brightness to image capture controller 14 based on the brightness values of the scene when the default target brightness is inaccurate for the scene.

Threshold storage device 22 stores a brightness threshold 26, a default population range 28, and an adjusted population range 29. In some cases, threshold storage device 22 may include multiple adjusted population ranges. Brightness threshold 26 and default population range 28 may be set for sensor array 12 and stored in threshold storage device 22 during manufacture of image capture device 10. Default population range 28 includes a low default population threshold and a high default population threshold for a population of bright regions in a scene. The low and high default population thresholds define the extremes of default population range 28. Adjusted population ranges 29 may be set by population threshold adjustment module 34 and stored in threshold storage device 22 during dynamic automatic exposure compensation within image capture device 10. Adjusted population range 29 may include low and high population thresholds adjusted from the default population thresholds.

Automatic exposure compensation module 18 provides the brightness values of the plurality of regions in the scene received from image capture controller 14 to brightness comparison module 30. The brightness values for each of the plurality of regions in the scene comprise luminance values ranging between 0 (i.e., black) and 255 (i.e., white). Brightness comparison module 30 compares the brightness values of each of the plurality of regions in the scene to brightness threshold 26 retrieved from threshold storage device 22. Brightness comparison module 30 then identifies one or more of the regions in the scene with brightness values greater than brightness threshold 26 as "bright regions." Brightness threshold 26 is typically set near a maximum luminance value of 255, e.g., in a range between 190 and 255 depending on the gamma. In this way, a relatively small number of the plurality of regions may be identified as bright regions.

Population comparison module 32 determines a population of the bright regions in the scene. For example, population comparison module 32 may specify the population as a number of bright regions in the scene or as a percentage or ratio of the number of bright regions to the total number of regions in the scene. Population comparison module 32 compares the population of the bright regions to default population range 28 retrieved from threshold storage device 22.

Population comparison module 32 then determines whether the default target brightness is accurate for the scene based on the bright region population comparison.

Since brightness threshold 26 is set equal to a relatively high luminance value to limit the number of regions in the scene identified as bright regions, default population range 28 is typically set equal to a relatively small number of the plurality of regions in the scene. For example, a low default population threshold of default population range 28 may be equal to approximately 0.5% of the total number of regions in the scene, and a high default population threshold of default population range 28 may be equal to approximately 3% of the total number of regions in the scene. In the case where the scene is evenly divided into 256 regions, the low default population threshold may be equal to approximately 1 or 2 regions, and the high default population threshold may be equal to approximately 7 or 8 regions.

Population comparison module 32 determines that the default target brightness is accurate for the scene when the population of the bright regions in the scene is within default population range 28. In other words, the default target brightness is accurate for the scene when the population of bright regions in the scene is greater than the low default population threshold, but less than the high default population threshold of default population range 28. Population comparison module 32 determines that the default target brightness is inaccurate for the scene when the population of the bright regions in the scene is outside of default population range 28. In other words, the default target brightness is inaccurate for the scene when the population of bright regions in the scene is either less than the low default population threshold, or greater than the high default population threshold of default population range 28.

In the case where population comparison module 32 determines that the default target brightness is accurate for the scene, automatic exposure compensation module 18 maintains the default target brightness and notifies image capture controller 14 to use the default target brightness. Sensor array 12 may then capture an image frame of the scene using the EV for the default target brightness.

In the case where population comparison module 32 determines that the default target brightness is inaccurate for the scene, target brightness adjustment module 36 dynamically adjusts the default target brightness to set an adjusted target brightness based on the population of the bright regions in the scene and default population range 28. For example, target brightness adjustment module 36 increases the default target brightness for the scene when the population of the bright regions is less than the low default population threshold. Target brightness adjustment module 36 reduces the default target brightness for the scene when the population of the bright regions is greater then the high default population threshold.

Automatic exposure compensation module 18 then sends the adjusted target brightness to image capture controller 14. Image capture controller 14 may perform automatic exposure based on the adjusted target brightness to select an EV for the adjusted target brightness. In some cases, it may be assumed that target brightness adjustment module 36 sufficiently adjusts the default target brightness to be accurate for the scene. Sensor array 12 may then capture an image frame of the scene using the EV for the adjusted target brightness.

In other cases, the target brightness adjustment module 36 may only minimally adjust the default target brightness for the scene. In this case, sensor array 12 may again obtain light information from the scene at the adjusted target brightness and image capture controller 14 may calculate brightness values for the regions of the scene based on the light information. Automatic exposure compensation module 18 then iteratively readjusts the adjusted target brightness until an accurate target brightness is set for the scene or until a maximum allowed target brightness adjustment is reached. Sensor array 12 may then capture an image frame of the scene using the EV for the readjusted target brightness.

Multiple image frames are often captured in the same environment. For example, a user of image capture device 10 may capture a series of still image frames or video frames in an environment that includes large amounts of reflected or saturated light or high levels of contrast, in which the default target brightness may be inaccurate. Therefore, after setting an adjusted target brightness for a given scene, automatic exposure compensation module 18 may build a hysteresis zone to substantially stabilize the adjusted target brightness for subsequent scenes.

If the adjusted target brightness is inaccurate for the next scene, automatic exposure compensation module 18 may build the hysteresis zone by adjusting the default population threshold values of the default population range 28 stored in threshold storage device 22. In some cases, automatic exposure compensation module 18 may build the hysteresis zone to maintain the adjusted target brightness for a next scene to prevent target brightness oscillation between the previous scene and the next scene. In other cases, automatic exposure compensation module 18 may build to hysteresis zone to minimally readjust the adjusted target brightness for a next scene to provide a gradual target brightness change between the previous scene and the next scene. In this way, brightness changes between frames may be reduced when capturing a series of still images or capturing video with image capture device 10.

For a next scene, sensor array 12 obtains light information from the next scene at the adjusted target brightness and image capture controller 14 calculates brightness values of a plurality of regions in the next scene. Automatic exposure compensation module 18 receives the brightness values of the plurality of regions in the next scene from image capture controller 14 and provides the brightness values to brightness comparison module 30. Substantially similar to the previous scene, brightness comparison module 30 compares the brightness values of each of the plurality of regions in the next scene to brightness threshold 26 retrieved from threshold storage device 22. Brightness comparison module 30 then identifies one or more of the regions in the next scene with brightness values greater than brightness threshold 26 as bright regions.

Population comparison module 32 determines a population of the bright regions in the next scene and compares the population of the bright regions to default population range 28 retrieved from threshold storage device 22. Population comparison module 32 then determines whether to adjust the default population thresholds of default population range 28 based on the comparison. When the population of the bright regions in the next scene is within default population range 28, population comparison module 32 maintains the default population thresholds of default population range 28. Automatic exposure compensation module 18 maintains the adjusted target brightness and notifies image capture controller 14 to use the adjusted target brightness. Sensor array 12 may then capture an image frame of the next scene using the EV for the adjusted target brightness.

When the population of the bright regions in the next scene is outside of default population range 28, population threshold adjustment module 34 dynamically adjusts the default population thresholds of default population range 28 to set an adjusted population range 29. Population threshold adjustment module 34 then stores adjusted population range 29 in threshold storage device 22. In some cases, population threshold adjustment module 34 may set adjusted population range 29 by adjusting only one of the low default population threshold or the high default population threshold to decrease or increase default population range 28. In this way, population threshold adjustment module 34 builds a hysteresis zone by setting different population ranges to substantially stabilize the adjusted target brightness between the previous scene and the next scene.

Population threshold adjustment module 34 dynamically adjusts the default population thresholds of default population range 28 based on the difference between the default population thresholds and the population of the bright regions in the next scene. For example, if the population of the bright regions is less than the low default population threshold of default population range 28, population threshold adjustment module 34 determines how much less the population of the bright regions is compared to the low default population threshold. If the population of the bright regions is greater than the high default population threshold of default population range 28, population threshold adjustment module 34 determines how much greater the population of the bright regions is compared to the high default population threshold.

In the case where the difference between the population of the bright regions in the next scene and the default population thresholds of default population range 28 is less than a predetermined value, population threshold adjustment module 34 dynamically adjusts the default population thresholds to set an adjusted population range 29 that includes the population of the bright regions in the next scene. In this way, automatic exposure compensation module 18 maintains the adjusted target brightness for the next scene to prevent target brightness oscillation between the previous scene and the next scene. Automatic exposure compensation module 18 notifies image capture controller 14 to use the adjusted target brightness. Sensor array 12 may then capture an image frame of the next scene using the EV for the adjusted target brightness.

In the case where the difference between the population of the bright regions in the next scene and the default population thresholds of default population range 28 is greater than a predetermined value, population threshold adjustment module 34 dynamically adjusts the default population thresholds to reduce the difference with the population of the bright regions in the next scene. In this way, automatic exposure compensation module 18 minimally readjusts the adjusted target brightness for the next scene to provide a gradual target brightness change between the previous scene and the next scene. Automatic exposure compensation module 18 sends the readjusted target brightness to image capture controller 14. Image capture controller 14 may perform automatic exposure based on the readjusted target brightness to select an EV for the readjusted target brightness. Sensor array 12 may then capture an image frame of the next scene using the EV for the readjusted target brightness.

Figure 3:
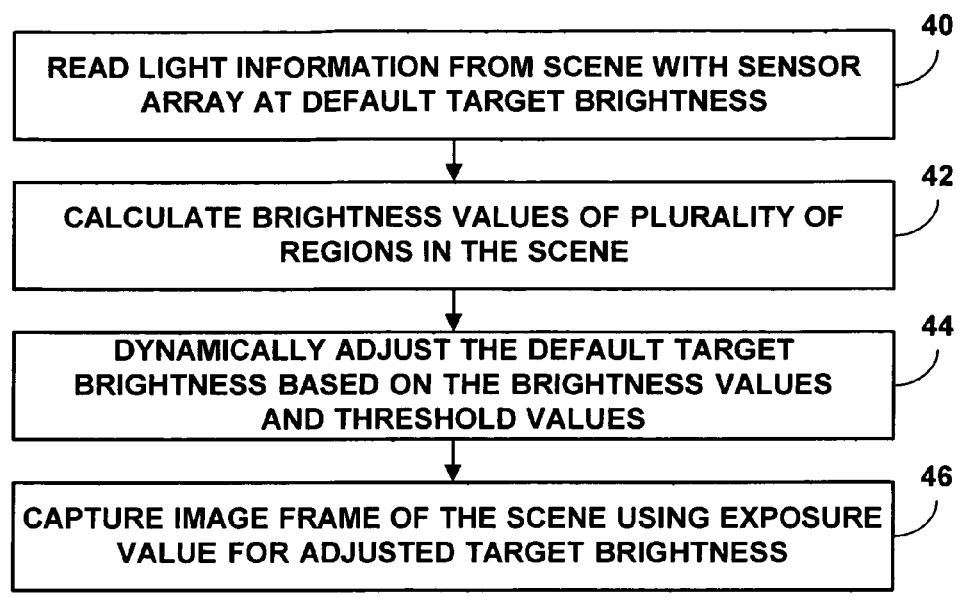
FIG. 3 is a flowchart illustrating exemplary operation of a dynamic automatic exposure compensation process within an image capture device.

FIG. 3 is a flowchart illustrating exemplary operation of a dynamic automatic exposure compensation process within an image capture device. The operation will be described herein in reference to image capture device 10 from FIG. 1. Sensor array 12 obtains light information from a scene at a default target brightness of image capture device 10 (40). For example, a typical default target brightness is approximately 18% gray. Image capture controller 14 controls an amount of light obtained by sensor array 12 by performing automatic exposure based on the default target brightness to select an EV for the default target brightness.

Image capture controller 14 receives the light information from sensor array 12 and calculates brightness values of a plurality of regions in the scene based on the light information (42). For example, the scene may be evenly divided into 256 regions with brightness values ranging between 0 (i.e., black) and 255 (i.e., white). Image capture controller 16 then sends the calculated brightness values to automatic exposure compensation module 18. Automatic exposure compensation module 18 dynamically adjusts the default target brightness of the image capture device based on the brightness values of the plurality of region in the scene and threshold values set for sensor array 12 (44). The default target brightness may be inaccurate for the scene when the brightness values of the plurality of regions in the scene are either too bright or too dark for the scene according to the threshold values stored in threshold storage device 22.

Automatic exposure compensation module 18 sends the adjusted target brightness to image capture controller 14. Image capture controller 14 performs automatic exposure based on the adjusted target brightness to select an EV for the adjusted target brightness. Sensor array 12 then captures an image frame of the scene using the EV for the adjusted target brightness (46). When the default target brightness is accurate for the scene, automatic exposure compensation module 18 may notify image capture controller 14 to use the default target brightness, and sensor array 12 may capture an image frame of the scene using the EV for the default target brightness. Upon capturing the image frame of the scene, sensor array 12 sends the image frame to image processor 16 for processing and storage in image storage device 20.

Figure 4A:
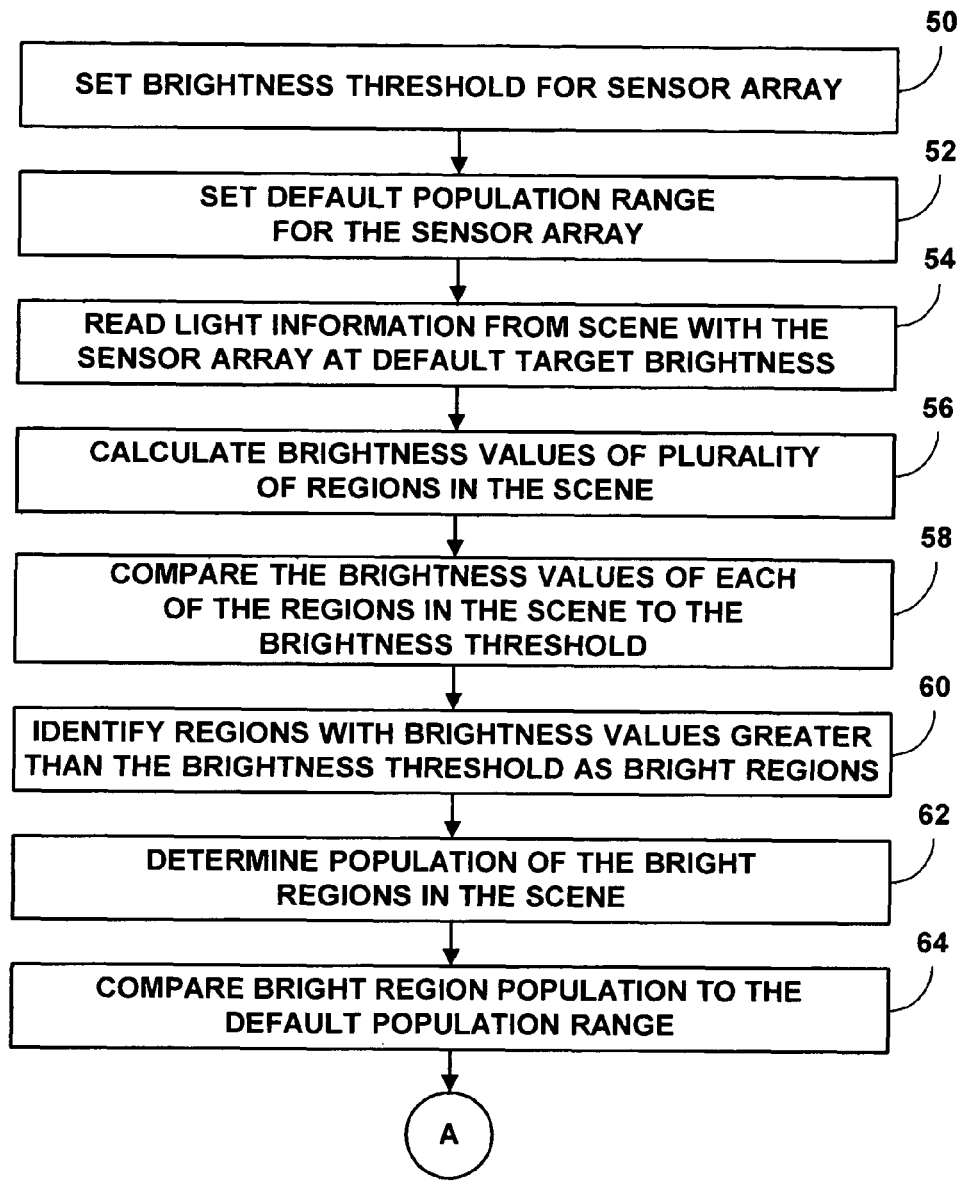
FIGS. 4A and 4B are flowcharts illustrating exemplary operation of a dynamic automatic exposure compensation process within an image capture device in greater detail.
Figure 4B:
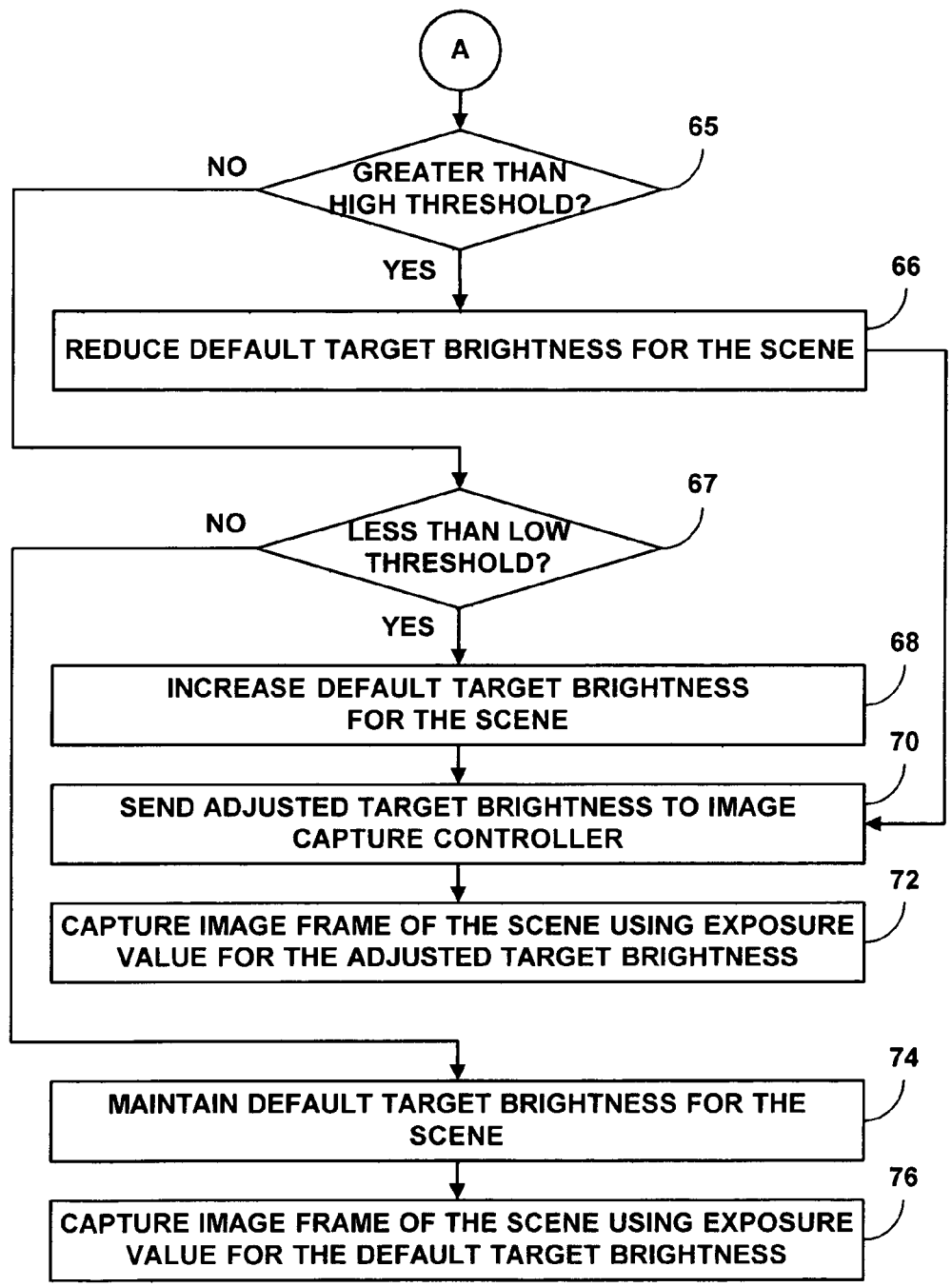

FIGS. 4A and 4B are flowcharts illustrating exemplary operation of a dynamic automatic exposure compensation process within an image capture device in greater detail. The operation will be described herein in reference to automatic exposure compensation module 18 and threshold storage device 22 from FIG. 2 included in image capture device 10. As illustrated in FIG. 4A, brightness threshold 26 may be set for sensor array 12 and stored in threshold storage device 22 during manufacture of image capture device 10 (50). Default population range 28 may be set for sensor array 12 and stored in threshold storage device 22 during manufacturing of image capture device 10 (52). Default population range 28 includes a low default population threshold and a high default population threshold for a population of bright regions in a scene.

Sensor array 12 obtains light information from a scene at a default target brightness of image capture device 10 (54). Image capture controller 14 controls an amount of light obtained by sensor array 12 by performing automatic exposure based on the default target brightness to select an EV for the default target brightness. Image capture controller 14 then receives the light information for the scene from sensor array 12 and divides the scene into a plurality of regions. Image capture controller 14 calculates brightness values of each of the plurality of regions in the scene based on the light information (56). Image capture controller 14 then sends the calculated brightness values to automatic exposure compensation module 18.

Brightness comparison module 30 within automatic exposure compensation module 18 compares the brightness values for each of the plurality of regions in the scene to brightness threshold 26 retrieved from threshold storage device 22 (58). Based on the comparison, brightness comparison module 30 determines which of the plurality of regions in the scene have brightness values that are greater than brightness threshold 26, and identifies these regions as bright regions (60). Population comparison module 32 also included in automatic exposure compensation module 18 determines the population of the bright regions in the scene (62). Population comparison module 32 may specify the population as a number of bright regions in the scene or as a percentage or ratio of the number of bright regions to the total number of regions in the scene. Population comparison module 32 compares the population of the bright regions in the scene to default population range 28 retrieved from threshold storage device 22 (64).

As illustrated in FIG. 4B, population comparison module 32 first compares the population of the bright regions to the high default population threshold of default population range 28 (65). If the population of the bright regions in the scene is greater than the high default population threshold, target brightness adjustment module 36 reduces the default target brightness of image capture device 10 for the scene to set an adjusted target brightness (66). Automatic exposure compensation module 18 then sends the adjusted target brightness to image capture controller 14 (70). Image capture controller 14 performs automatic exposure based on the adjusted target brightness to select an EV for the adjusted target brightness. Sensor array 12 may then capture an image frame of the scene using the EV for the adjusted target brightness (72).

If the population of the bright regions in the scene is less than the high default population threshold of default population range 28, population comparison module compares the population of the bright regions to the low population default threshold of default population range 28 (67). If the population of the bright regions in the scene is less than the low default population threshold, target brightness adjustment module 36 increases the default target brightness of image capture device 10 for the scene to set an adjusted target brightness (68). Automatic exposure compensation module 18 then sends the adjusted target brightness to image capture controller 14 (70). Image capture controller 14 performs automatic exposure based on the adjusted target brightness to select an EV for the adjusted target brightness. Sensor array 12 may then capture an image frame of the scene using the EV for the adjusted target brightness (72).

In either case, it may be assumed that target brightness adjustment module 36 sufficiently adjusts the default target brightness to be accurate for the scene. In other embodiments, the target brightness adjustment module 36 may only minimally adjust the default target brightness for the scene. In this case, sensor array 12 may again obtain light information from the scene at the adjusted target brightness and image capture controller 14 may calculate brightness values for the regions of the scene based on the light information. Automatic exposure compensation module 18 then iteratively readjusts the adjusted target brightness until an accurate target brightness is set for the scene or until a maximum allowed target brightness adjustment is reached. Sensor array 12 may then capture an image frame of the scene using the EV for the readjusted target brightness.

If the population of the bright regions in the scene is less than the high default population threshold and greater than the low default population threshold of default, automatic exposure compensation module 18 maintains the default target brightness of image capture device 10 for the scene (74). Automatic exposure compensation module 18 then notifies image capture controller 14 to use the default target brightness. Sensor array 12 may then capture an image frame of the scene using the EV for the default target brightness (76).

Figure 5:
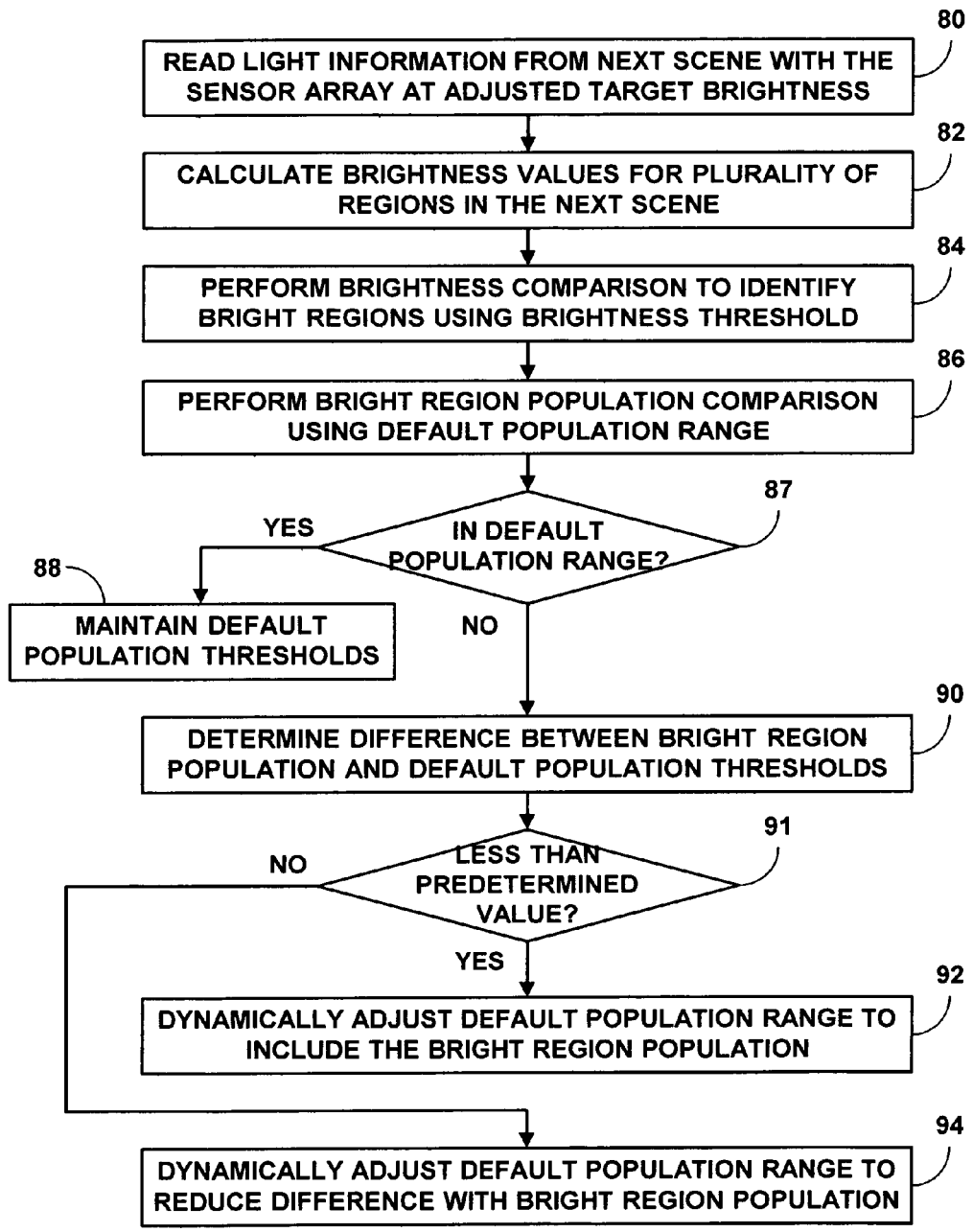
FIG. 5 is a flowchart illustrating use of a hysteresis zone to substantially stabilize an adjusted target brightness of an image capture device over a sequence of image scenes.

FIG. 5 is a flowchart illustrating use of a hysteresis zone to substantially stabilize an adjusted target brightness of an image capture device over a sequence of image scenes. The operation will be described herein in reference to automatic exposure compensation module 18 and threshold storage device 22 from FIG. 2 included in image capture device 10. After setting an adjusted target brightness for a scene, automatic exposure compensation module 18 may build a hysteresis zone to substantially stabilize the adjusted target brightness for subsequent scenes.

For a next scene, sensor array 12 obtains light information from the next scene at the adjusted target brightness (80). Image capture controller 14 calculates brightness values of a plurality of regions in the next scene (82). Automatic exposure compensation module 18 receives the brightness values of the plurality of regions in the next scene from image capture controller 14. Substantially similar to the previous scene, brightness comparison module 30 performs a brightness comparison between the brightness values of each of the plurality of regions in the next scene and brightness threshold 26 retrieved from threshold storage device 22 to identify one or more of the regions in the next scene with brightness values greater than brightness threshold 26 as bright regions (84).

Population comparison module 32 determines a population of the bright regions in the next scene. Population comparison module 32 then performs a bright region population comparison between the population of the bright regions in the next scene and default population range 28 retrieved from threshold storage device 22 (86). If the population of the bright regions in the next scene is within default population range 28 (YES branch of 87), population comparison module 32 maintains the default population thresholds of default population range 28 (88). Automatic exposure compensation module 18 then maintains the adjusted target brightness and notifies image capture controller 14 to use the adjusted target brightness. Sensor array 12 may then capture an image frame of the next scene using the EV for the adjusted target brightness.

If the population of the bright regions in the next scene is outside of default population range 28 (NO branch of 87), population threshold adjustment module 34 determines the difference between the population of the bright regions in the next scene and the default population thresholds of default population range 28 (90). Population threshold adjustment module 34 dynamically adjusts the default population thresholds of default population range 28 to set an adjusted population range 29 based on the difference. Population threshold adjustment module 34 then stores adjusted population range 29 in threshold storage device 22. In this way, population threshold adjustment module 34 builds a hysteresis zone by setting different population ranges to substantially stabilize the adjusted target brightness for the next scene.

If the difference is less than a predetermined value (YES branch of 91), population threshold adjustment module 34 dynamically adjusts the default population thresholds of default population range 28 to set an adjusted population range 29 that includes the population of the bright regions in the next scene (92). In this way, automatic exposure compensation module 18 maintains the adjusted target brightness for the next scene to prevent target brightness oscillation between the previous scene and the next scene. Automatic exposure compensation module 18 notifies image capture controller 14 to use the adjusted target brightness. Sensor array 12 may then capture an image frame of the next scene using the EV for the adjusted target brightness.

If the difference is greater than the predetermined value (NO branch of 91), population threshold adjustment module 34 dynamically adjusts the default population thresholds of default population range 28 to reduce the difference with the population of the bright regions in the next scene (94). In this way, automatic exposure compensation module 18 minimally readjusts the adjusted target brightness for the next scene to provide a gradual target brightness change between the previous scene and the next scene. Automatic exposure compensation module 18 sends the readjusted target brightness to image capture controller 14. Image capture controller 14 may perform automatic exposure based on the readjusted target brightness to select an EV for the readjusted target brightness. Sensor array 12 may then capture an image frame of the next scene using the EV for the readjusted target brightness.

A number of embodiments have been described. However, various modifications to these embodiments are possible, and the principles presented herein may be applied to other embodiments as well. Methods as described herein may be implemented in hardware, software, and/or firmware. The various tasks of such methods may be implemented as sets of instructions executable by one or more arrays of logic elements, such as microprocessors, embedded controllers, or IP cores. In one example, one or more such tasks are arranged for execution within a mobile station modem chip or chipset that is configured to control operations of various devices of a personal communications device such as a cellular telephone.

The techniques described in this disclosure may be implemented within a general purpose microprocessor, digital signal processor (DSP), application specific integrated circuit (ASIC), field programmable gate array (FPGA), or other equivalent logic devices. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

As further examples, an embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

In this disclosure, techniques have been described for dynamic automatic exposure compensation within image capture devices. The techniques include dynamically adjusting a default target brightness for an image capture device to compensate an EV when the default target brightness is inaccurate for a given scene. In this way, if an automatic exposure process within the image capture device originally selects an EV for the default target brightness that is either too bright or too dark for the scene, the techniques set an adjusted target brightness. The automatic exposure process may then select an EV for the adjusted target brightness that produces an image frame of the scene with an appropriate brightness.

An image capture device includes a sensor array that obtains light information from a scene at a default target brightness and an image capture controller that calculates brightness values of a plurality of regions in the scene based on the light information. According to the techniques described herein, an automatic exposure compensation module included in the image capture device determines whether the default target brightness is accurate for the scene based on the brightness values of the regions in the scene and thresholds values set for the sensor array. If the default target brightness is inaccurate, the automatic exposure compensation module dynamically adjusts the default target brightness to set an adjusted target brightness that is accurate for the scene. The sensor array may then capture an image frame of the scene using an EV for the adjusted target brightness. In this way, the techniques provide a simple and inexpensive solution to manual automatic exposure compensation.

In addition, the techniques include building a hysteresis zone to substantially stabilize the adjusted target brightness over a sequence of image scenes. If the adjusted target brightness is inaccurate for the next scene, the automatic exposure compensation module may build the hysteresis zone by adjusting the threshold values set for the sensor array. The automatic exposure compensation module included in the image capture device may build the hysteresis zone to maintain the adjusted target brightness for a next scene to prevent target brightness oscillation between the previous scene and the next scene, or to minimally readjust the adjusted target brightness for a next scene to provide a gradual target brightness change between the previous scene and the next scene. This may be especially useful when capturing a series of still images or capturing video with the image capture device to reduce brightness changes between frames. These and other embodiments are within the scope of the following claims.

The invention claimed is:

1. A method in an image capture device, comprising:
obtaining light information from a scene with a sensor array included in the image capture device at a default target brightness;
calculating brightness values of a plurality of regions in the scene based on the light information; and
dynamically adjusting the default target brightness based on the brightness values of the plurality of regions in the scene and threshold values set for the sensor array to set an adjusted target brightness for the scene.

2. The method of claim 1, further comprising:
performing automatic exposure for the scene based on the adjusted target brightness to select an exposure value for the adjusted target brightness; and
capturing an image frame of the scene with the sensor array using the exposure value for the adjusted target brightness.

3. The method of claim 1, further comprising iteratively readjusting the adjusted target brightness based on the brightness values of the plurality of regions in the scene at the adjusted target brightness and the threshold values set for the sensor array.

4. The method of claim 1, wherein obtaining light information from a scene at a default target brightness comprises performing automatic exposure for the scene based on the default target brightness to select an exposure value for the default target brightness.

5. The method of claim 4, further comprising:
maintaining the default target brightness; and
capturing an image frame of the scene with the sensor array using the exposure value for the default target brightness.

6. The method of claim 1, further comprising determining whether the default target brightness is accurate for the scene based on the brightness values of the plurality of regions in the scene.

7. The method of claim 6, wherein determining whether the default target brightness is accurate for the scene comprises:
performing a brightness comparison between the brightness values of each of the plurality of regions in the scene and a brightness threshold set for the image sensor to identify one or more of the regions with brightness values greater than the brightness threshold as bright regions; and performing a bright region population comparison between a population of the bright regions in the scene and a default population range set for the image sensor, wherein the default target brightness is accurate for the scene when the population of the bright regions in the scene is within the default population range, and wherein the default target brightness is inaccurate for the scene when the population of the bright regions in the scene is outside of the default population range.

8. The method of claim 1, further comprising:
comparing the brightness values of each of the plurality of regions in the scene to a brightness threshold set for the image sensor;
identifying one or more of the regions with brightness values greater than the brightness threshold as bright regions;
determining a population of the bright regions in the scene; and
comparing the population of the bright regions to a default population range set for the image sensor.

9. The method of claim 8, wherein dynamically adjusting the default target brightness comprises:
increasing the default target brightness for the scene when the population of the bright regions is less than a low default population threshold of the default population range;
decreasing the default target brightness for the scene when the population of the bright regions is greater then a high default population threshold of the default population range; and
maintaining the default target brightness for the scene when the population of the bright regions is between the low default population threshold and the high default population threshold.

10. The method of claim 8, wherein dynamically adjusting the default target brightness comprises:
adjusting the default target brightness when the population of the bright regions is outside of the default population range; and
maintaining the default target brightness when the population of the bright regions is within the default population range.

11. The method of claim 1, further comprising maintaining the adjusted target brightness for a next scene to prevent target brightness oscillation between the scene and the next scene.

12. The method of claim 1, further comprising minimally readjusting the adjusted target brightness for a next scene to provide a gradual target brightness change between the scene and the next scene.

13. The method of claim 1, further comprising:
obtaining light information from a next scene with the sensor array at the adjusted target brightness;
calculating brightness values of a plurality of regions in the next scene based on the light information;
comparing the brightness values of each of the plurality of regions in the next scene to a brightness threshold set for the image sensor;
identifying one or more of the regions with brightness values greater than the brightness threshold as bright regions;
determining a population of the bright regions in the next scene;

comparing the population of the bright regions to a default population range set for the image sensor; and
dynamically adjusting default population thresholds of the default population range to set an adjusted population range when the population of the bright regions in the next scene is outside of the default population range.

14. The method of claim 13, further comprising maintaining the default population thresholds when the population of the bright regions in the next scene is within the default population range.

15. The method of claim 13, wherein dynamically adjusting the default population thresholds comprises building a hysteresis zone by setting different population ranges to substantially stabilize the adjusted target brightness between the scene and the next scene.

16. The method of claim 13, further comprising determining the difference between the default population thresholds and the population of the bright regions in the next scene, wherein dynamically adjusting the default population thresholds comprises dynamically adjusting the default population thresholds based on the difference.

17. The method of claim 16, wherein dynamically adjusting the default population thresholds comprises dynamically adjusting the default population thresholds to set an adjusted population range that includes the population of the bright regions in the next scene when the difference is less than a predetermined value to maintain the adjusted target brightness for the next scene.

18. The method of claim 16, wherein dynamically adjusting the default population thresholds comprises dynamically adjusting the default population thresholds to reduce the difference with the population of the bright regions in the next scene when the difference is more than a predetermined value to minimally readjust the adjusted target brightness for the next scene.

19. The method of claim 1, wherein setting the threshold values for the image sensor comprises:
setting a brightness threshold for the image sensor; and
setting a default population range for the image sensor.

20. A computer-readable medium comprising instructions that cause a programmable processor to:
obtain light information from a scene with a sensor array included in an image capture device at a default target brightness;
calculate brightness values of a plurality of regions in the scene based on the light information; and
dynamically adjust the default target brightness based on the brightness values of the plurality of regions in the scene and threshold values set for the sensor array to set an adjusted target brightness for the scene.

21. The computer-readable medium of claim 20, wherein the instructions cause the programmable processor to:
perform a brightness comparison between the brightness values of each of the plurality of regions in the scene and a brightness threshold set for the image sensor to identify one or more of the regions with brightness values greater than the brightness threshold as bright regions; and
perform a bright region population comparison between a population of the bright regions in the scene and a default population range set for the image sensor,
wherein the default target brightness is accurate for the scene when the population of the bright regions in the scene is within the default population range, and wherein the default target brightness is inaccurate for the scene when the population of the bright regions in the scene is outside of the default population range.

22. The computer-readable medium of claim 20, further comprising instructions that cause the programmable processor to:
  compare the brightness values of each of the plurality of regions in the scene to a brightness threshold set for the image sensor;
  identify one or more of the regions with brightness values greater than the brightness threshold as bright regions;
  determine a population of the bright regions in the scene; and
  compare the population of the bright regions to a default population range set for the image sensor.

23. The computer-readable medium of claim 22, wherein the instructions cause the programmable processor to:
  increase the default target brightness for the scene when the population of the bright regions is less than a low default population threshold of the default population range;
  decrease the default target brightness for the scene when the population of the bright regions is greater then a high default population threshold of the default population range; and
  maintain the default target brightness for the scene when the population of the bright regions is between the low default population threshold and the high default population threshold.

24. The computer-readable medium of claim 20, further comprising instructions that cause the programmable processor to maintain the adjusted target brightness for a next scene to prevent target brightness oscillation between the scene and the next scene.

25. The computer-readable medium of claim 20, further comprising instructions that cause the programmable processor to minimally readjust the adjusted target brightness for a next scene to provide a gradual target brightness change between the scene and the next scene.

26. The computer-readable medium of claim 20, further comprising instructions that cause the programmable processor to:
  obtain light information from a next scene with the sensor array at the adjusted target brightness;
  calculate brightness values of a plurality of regions in the next scene based on the light information;
  compare the brightness values of each of the plurality of regions in the next scene to a brightness threshold set for the image sensor;
  identify one or more of the regions with brightness values greater than the brightness threshold as bright regions;
  determine a population of the bright regions in the next scene;
  compare the population of the bright regions to a default population range set for the image sensor; and
  dynamically adjust the default population thresholds of the default population range to set an adjusted population range when the population of the bright regions in the next scene is outside of the default population range.

27. The computer-readable medium of claim 26, wherein the instructions cause the programmable processor to build a hysteresis zone by setting different population ranges to substantially stabilize the adjusted target brightness between the scene and the next scene.

28. The computer-readable medium of claim 26, further comprising instructions that cause the programmable processor to:
  determine the difference between the default population thresholds and the population of the bright regions in the next scene;
  dynamically adjust the default population thresholds to set an adjusted population range that includes the population of the bright regions in the next scene when the difference is less than a predetermined value to maintain the adjusted target brightness for the next scene; and
  dynamically adjust the default population thresholds to reduce the difference with the population of the bright regions in the next scene when the difference is more than a predetermined value to minimally readjust the adjusted target brightness for the next scene.

29. A device comprising:
  a sensor array that obtains light information from a scene at a default target brightness;
  an image capture controller that calculates brightness values of a plurality of regions in the scene based on the light information; and
  an automatic exposure compensation module that dynamically adjusts the default target brightness based on the brightness values of the plurality of regions in the scene and threshold values set for the sensor array to set an adjusted target brightness for the scene.

30. The device of claim 29,
  wherein the image capture controller performs automatic exposure for the scene based on the adjusted target brightness to select an exposure value for the adjusted target brightness; and
  wherein the sensor array captures an image frame of the scene using the exposure value for the adjusted target brightness.

31. The device of claim 29, wherein the automatic exposure compensation module iteratively readjusts the adjusted target brightness based on the brightness values of the plurality of regions in the scene at the adjusted target brightness and the thresholds set for the sensor array.

32. The device of claim 29, wherein the image capture controller performing automatic exposure for the scene based on the default target brightness to select an exposure value for the default target brightness.

33. The device of claim 32,
  wherein the automatic exposure compensation module maintains the default target brightness; and
  wherein the sensor array captures an image frame of the scene using the exposure value for the default target brightness.

34. The device of claim 29, wherein the automatic exposure compensation module determines whether the default target brightness is accurate for the scene based on the brightness values of the plurality of regions in the scene.

35. The device of claim 34, wherein the automatic exposure compensation module includes:
  a brightness comparison module that performs a brightness comparison between the brightness values of each of the plurality of regions in the scene and a brightness threshold set for the image sensor to identify one or more of the regions with brightness values greater than the brightness threshold as bright regions; and
  a population comparison module that performs a bright region population comparison between a population of the bright regions in the scene and a default population range set for the image sensor,
  wherein the default target brightness is accurate for the scene when the population of the bright regions in the scene is within the default population range, and wherein the default target brightness is inaccurate for the scene when the population of the bright regions in the scene is outside of the default population range.

36. The device of claim 29, wherein the automatic exposure compensation module includes:
 a brightness comparison module that compares the brightness values of each of the plurality of regions in the scene to a brightness threshold set for the image sensor, and identifies one or more of the regions with brightness values greater than the brightness threshold as bright regions; and
 a population comparison module that determines a population of the bright regions in the scene, and compares the population of the bright regions to a default population range set for the image sensor.

37. The device of claim 36,
 wherein the automatic exposure compensation module includes a target brightness adjustment module that increases the default target brightness for the scene when the population of the bright regions is less than a low default population threshold of the default population range, and decreases the default target brightness for the scene when the population of the bright regions is greater then a high default population threshold of the default population range; and
 wherein the automatic exposure compensation module maintains the default target brightness for the scene when the population of the bright regions is between the low default population threshold and the high default population threshold.

38. The device of claim 36,
 wherein the automatic exposure compensation module includes a target brightness adjustment module that adjusts the default target brightness when the population of the bright regions is outside of the default population range; and
 wherein the automatic exposure compensation module maintains the default target brightness when the population of the bright regions is within the default population range.

39. The device of claim 29, wherein the automatic exposure compensation module maintains the adjusted target brightness for a next scene to prevent target brightness oscillation between the scene and the next scene.

40. The device of claim 29, wherein the automatic exposure compensation module minimally readjusts the adjusted target brightness for a next scene to provide a gradual target brightness change between the scene and the next scene.

41. The device of claim 29,
 wherein the sensor array obtains light information from a next scene at the adjusted target brightness;
 wherein the image capture controller calculates brightness values of a plurality of regions in the next scene based on the light information; and
 wherein the automatic exposure compensation module includes:
  a brightness comparison module that compares the brightness values of each of the plurality of regions in the next scene to a brightness threshold set for the image sensor and identifies one or more of the regions with brightness values greater than the brightness threshold as bright regions,
  a population comparison module that, and determines a population of the bright regions in the next scene and compares the population of the bright regions to a default population range set for the image sensor, and
  a population threshold adjustment module that dynamically adjusts default population thresholds of the default population range to set an adjusted population range when the population of the bright regions in the next scene is outside of the default population range.

42. The device of claim 41, wherein the automatic exposure compensation module maintains the default population thresholds when the population of the bright regions in the next scene is within the default population range.

43. The device of claim 41, wherein the population threshold adjustment module builds a hysteresis zone by setting different population ranges to substantially stabilize the adjusted target brightness between the scene and the next scene.

44. The device of claim 41,
 wherein the population comparison module determines the difference between the default population thresholds and the population of the bright regions in the next scene; and
 wherein the population threshold adjustment module dynamically adjusts the default population thresholds based on the difference.

45. The device of claim 44,
 wherein the population threshold adjustment module dynamically adjusts the default population thresholds to set an adjusted population range that includes the population of the bright regions when the difference is less than a predetermined value; and
 wherein the automatic exposure compensation module maintains the adjusted target brightness for the next scene.

46. The device of claim 44,
 wherein the population threshold adjustment module dynamically adjusts the default population thresholds to reduce the difference with the population of the bright regions in the next scene when the difference is more than a predetermined value, and
 wherein the target brightness adjustment module minimally readjusts the adjusted target brightness for the next scene.

47. The device of claim 29, further comprising a threshold storage that includes:
 a brightness threshold set for the image sensor;
 a default population range set for the image sensor; and
 adjusted population ranges set by the automatic exposure compensation module.

48. The device of claim 47, wherein the brightness values for each of the plurality of regions in the scene comprise luminance values between 0 and 255, and wherein the brightness threshold comprises a luminance value set near a maximum luminance value of 255.

49. The device of claim 47, wherein the default population range includes:
 a low default population threshold set to approximately 0.5% of the plurality of regions in the scene; and
 a high default population threshold set to approximately 3% of the plurality of regions in the scene.

50. A device comprising:
 means for obtaining light information from a scene at a default target brightness;
 means for calculating brightness values of a plurality of regions in the scene based on the light information; and
 means for dynamically adjusting the default target brightness based on the brightness values of the plurality of regions in the scene and threshold values to set an adjusted target brightness for the scene.

51. The device of claim 50, wherein the means for dynamically adjusting the default target brightness includes:
 means for comparing the brightness values of each of the plurality of regions in the scene to a brightness threshold set for the image sensor, and identifying one or more of the regions with brightness values greater than the brightness threshold as bright regions;

means for determining a population of the bright regions in the scene, and comparing the population of the bright regions to a default population range set for the image sensor; and means for increasing the default target brightness for the scene when the population of the bright regions is less than a low default population threshold of the default population range, decreasing the default target brightness for the scene when the population of the bright regions is greater then a high default population threshold of the default population range, and maintaining the default target brightness for the scene when the population of the bright regions is between the low default population threshold and the high default population threshold.

52. The device of claim 50, wherein the means for dynamically adjusting the default target brightness maintains the adjusted target brightness for a next scene to prevent target brightness oscillation between the scene and the next scene.

53. The device of claim 50, wherein the means for dynamically adjusting the default target brightness minimally readjusts the adjusted target brightness for a next scene to provide a gradual target brightness change between the scene and the next scene.

* * * * *

UNITED STATES PATENT AND TRADEMARK OFFICE
CERTIFICATE OF CORRECTION

| | | |
|---|---|---|
| PATENT NO. | : 7,725,022 B2 | Page 1 of 1 |
| APPLICATION NO. | : 11/508379 | |
| DATED | : May 25, 2010 | |
| INVENTOR(S) | : Noyes et al. | |

It is certified that error appears in the above-identified patent and that said Letters Patent is hereby corrected as shown below:

Column 15, line 32, claim 9: "greater then" to read as --greater than--

Column 17, line 19, claim 23: "greater then" to read as --greater than--

Column 19, line 21, claim 37: "greater then" to read as --greater than--

Column 21, line 03, claim 51: "greater then" to read as --greater than--

Signed and Sealed this
Fifth Day of July, 2011

David J. Kappos
*Director of the United States Patent and Trademark Office*